United States Patent
Iwata et al.

(10) Patent No.: US 11,270,683 B2
(45) Date of Patent: Mar. 8, 2022

(54) INTERACTIVE SYSTEM, APPARATUS, AND METHOD

(71) Applicant: KABUSHIKI KAISHA TOSHIBA, Tokyo (JP)

(72) Inventors: Kenji Iwata, Tokyo (JP); Hiroshi Fujimura, Yokohama Kanagawa (JP); Yuka Kobayashi, Seto Aichi (JP); Takami Yoshida, Kawasaki Kanagawa (JP); Masami Akamine, Yokosuka Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 66 days.

(21) Appl. No.: 16/556,352

(22) Filed: Aug. 30, 2019

(65) Prior Publication Data

US 2020/0143792 A1    May 7, 2020

(30) Foreign Application Priority Data

Nov. 7, 2018    (JP) .............................. JP2018-209691

(51) Int. Cl.
*G10L 15/18*    (2013.01)
*G10L 13/08*    (2013.01)
(Continued)

(52) U.S. Cl.
CPC ........ *G10L 13/086* (2013.01); *G10L 15/1822* (2013.01); *G10L 15/22* (2013.01);
(Continued)

(58) Field of Classification Search
CPC ............... G10L 15/086; G10L 15/1822; G10L 15/22; G10L 15/26; G06F 16/3329; G06F 16/951
(Continued)

(56) References Cited

U.S. PATENT DOCUMENTS 7,685,084 B2 *   3/2010   Sisk ...................... G06F 16/951
                                                        706/45
7,912,726 B2 *   3/2011   Alshawi .............. H04M 3/4936
                                                        704/270.1
(Continued)

FOREIGN PATENT DOCUMENTS

JP     2006-79462 A      3/2006
JP     2013-250926 A    12/2013

OTHER PUBLICATIONS

Atushi Moribe et al., "New Techniques for Artificial Chatting Entities with simulated personality," IEICE Technical Report, vol. 105, No. 285, pp. 11-16 (2005).

*Primary Examiner* — Susan I McFadden
(74) *Attorney, Agent, or Firm* — Finnegan, Henderson, Farabow, Garrett & Dunner L.L.P.

(57) ABSTRACT

According to one embodiment, an interactive system includes following units. The knowledge reference unit refers to a question-answering knowledge based on a result of analyzing an input sentence to acquire a candidate for an answer to the input sentence. The unknown keyword detection unit detects, from the input sentence, an unknown keyword. The related keyword estimation unit acquires, in response to the detection of the unknown keyword, one or more candidates for a related keyword having a meaning close to the unknown keyword from predetermined keywords. The response generation unit generates a response to the input sentence based on the one or more candidates for the related keyword when the unknown keyword is detected.

12 Claims, 8 Drawing Sheets

(51) Int. Cl.
  *G10L 15/22*  (2006.01)
  *G10L 17/24*  (2013.01)
  *G10L 15/26*  (2006.01)
(52) U.S. Cl.
  CPC .............. *G10L 15/26* (2013.01); *G10L 17/24* (2013.01); *G10L 2015/225* (2013.01); *G10L 2015/226* (2013.01)
(58) Field of Classification Search
  USPC ........................................................ 704/260
  See application file for complete search history.

(56) References Cited

U.S. PATENT DOCUMENTS

| | | | | |
|---|---|---|---|---|
| 8,386,405 | B2* | 2/2013 | Antebi | G06N 5/022 706/45 |
| 8,548,915 | B2* | 10/2013 | Antebi | G06N 5/02 705/45 |
| 8,924,330 | B2* | 12/2014 | Antebi | G06F 16/2462 706/45 |
| 9,530,098 | B2* | 12/2016 | Antebi | G06F 16/2462 |
| 9,984,067 | B2* | 5/2018 | Visel | G06F 40/30 |
| 10,581,772 | B2* | 3/2020 | Endo | H04L 67/325 |
| 10,599,275 | B2* | 3/2020 | He | G06F 3/0448 |
| 10,621,252 | B2* | 4/2020 | Mathieu | G06F 16/24578 |
| 10,810,217 | B2* | 10/2020 | Winstanley | G06F 16/2468 |

* cited by examiner

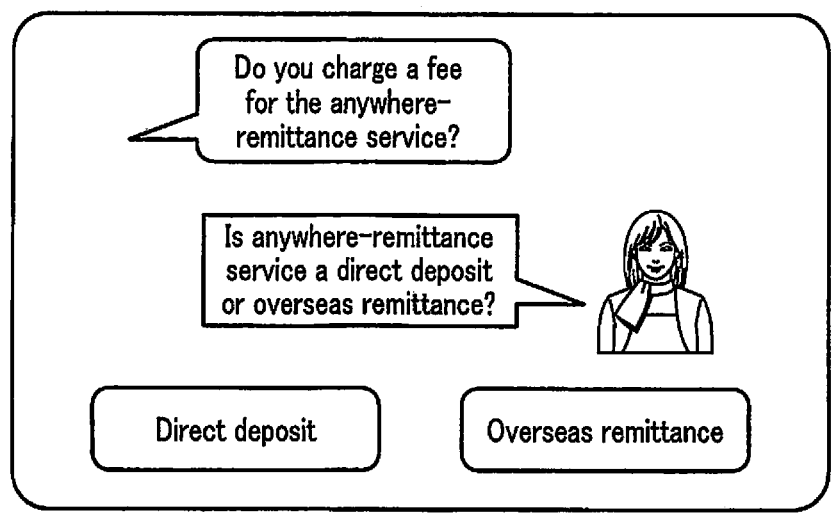
F I G. 8

INTERACTIVE SYSTEM, APPARATUS, AND METHOD

CROSS-REFERENCE TO RELATED APPLICATIONS

This application is based upon and claims the benefit of priority from Japanese Patent Application No. 2018-209691, filed Nov. 7, 2018, the entire contents of which are incorporated herein by reference.

FIELD

Embodiments described herein relate generally to an interactive system, apparatus, and method.

BACKGROUND

An interactive apparatus interacts with a user through voice or texts, and answers users' questions. Such interactive device is expected to be utilized in various situations. It is important that the interactive device can present an appropriate answer to the user even if the users' question is complicated or ambiguous.

Some interactive devices make an inquiry to the user so as to appropriately answer a complicated or ambiguous question. However, if the user's question includes an unknown keyword (a keyword that the system does not know, namely, a keyword not registered in a dictionary referred to by the interactive device), the interactive device sometimes fail to appropriately answer the question despite the inquiry to the user having been made. For example, assume that a user inputs "How do I apply for a security loan?" to a bank-related interactive device. If "security loan" is an unknown keyword, the interactive device generates a response sentence, "What would you like to apply for?" based on the understandable character string, "How do I apply for," and presents the sentence to the user. In response to this, the user may input "A security loan." In this case, the interactive device can merely output the same response sentence and the conversation repeats in a loop, which makes the conversation uncomfortable for the user.

The interactive device is required to be able to output a response to continue interaction with the user even if the user's question includes an unknown keyword.

BRIEF DESCRIPTION OF THE DRAWINGS

FIG. 8 is a diagram showing a presentation example of a response according to the embodiment.

DETAILED DESCRIPTION

According to one embodiment, an interactive system includes a text analysis unit, a knowledge reference unit, an unknown keyword detection unit, a related keyword estimation unit, and a response generation unit. The text analysis unit analyzes an input sentence from a user. The knowledge reference unit refers to a question-answering knowledge based on a result of analyzing the input sentence to acquire a candidate for an answer to the input sentence. The unknown keyword detection unit detects, from the input sentence, an unknown keyword that is a keyword based on which the candidate for the answer cannot be acquired even by referring to the question-answering knowledge. The related keyword estimation unit acquires, in response to the detection of the unknown keyword, one or more candidates for a related keyword having a meaning close to the unknown keyword from predetermined keywords. The response generation unit generates a response to the input sentence based on the candidate for the answer when the unknown keyword is not detected, and generates a response to the input sentence based on the one or more candidates for the related keyword when the unknown keyword is detected.

Hereinafter, embodiments will be described with reference to the accompanying drawings.

Figure 1:
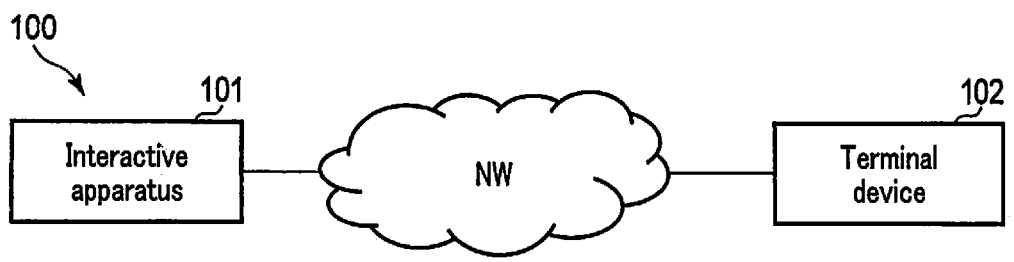
FIG. 1 is a block diagram showing an example of an interactive system according to one embodiment.

FIG. 1 schematically shows an interactive system 100 according to one embodiment. As shown in FIG. 1, the interactive system 100 includes an interactive apparatus 101 and a terminal device 102. The interactive apparatus 101 and the terminal device 102 are connected to a communication network NW such as the Internet, and can communicate with each other via the communication network NW.

The terminal device 102 may be a computer such as a personal computer or a smartphone. The terminal device 102 includes a microphone as an input device, and a display device and a speaker as output devices. The terminal device 102 receives user's speech (voice emitted by the user) with the microphone, and generates a speech signal indicating the user's speech. Then, the terminal device 102 transmits the speech signal to the interactive apparatus 101 via the communication network NW.

In another embodiment, the terminal device 102 may acquire a text corresponding to the speech signal by performing speech recognition on the speech signal, and transmit text data indicating the text to the interactive apparatus 101. In a further embodiment, the terminal device 102 may include a keyboard or a touch screen as an input device, and transmit to the interactive apparatus 101 text data indicating a text input by the user using the keyboard or the touch screen.

The interactive apparatus 101 receives the speech signal from the terminal device 102 via the communication network NW. The interactive apparatus 101 processes the received speech signal, and transmits, to the terminal device 102 via the communication network NW, a response signal including a response to the speech of the user. The response signal may include a speech signal output from a speaker of the terminal device 102, but is not limited thereto. For example, the response signal may include text data. The terminal device 102 may display, on the display device, the text data received from the interactive apparatus 101. The terminal device 102 may perform speech synthesis on the text data received from the interactive apparatus 101, and output speech corresponding to the text data from the speaker.

The interactive system 100 shown in FIG. 1 is merely an example. For example, the interactive apparatus 101 and the terminal device 102 may be configured as one device.

Figure 2:
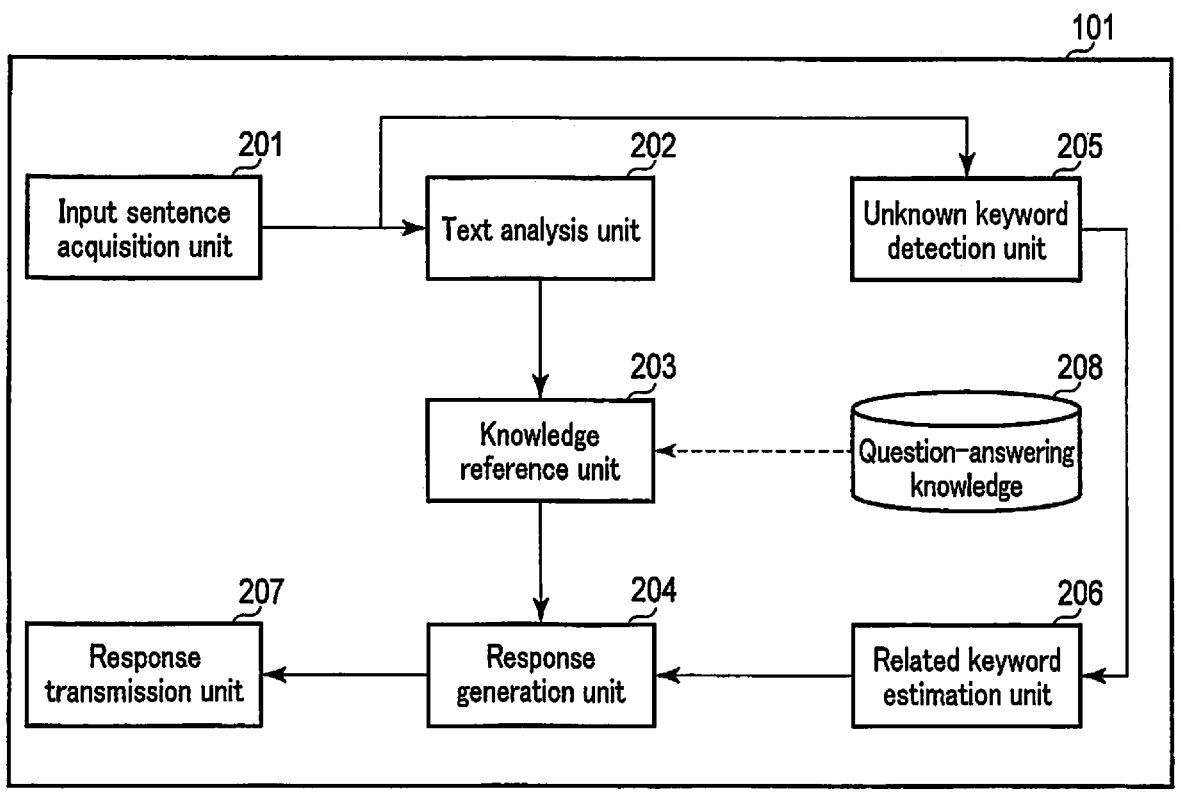
FIG. 2 is a block diagram showing an example of an interactive apparatus according to the embodiment.

FIG. 2 schematically shows a configuration example of the interactive apparatus 101. As shown in FIG. 2, the interactive apparatus 101 includes an input sentence acquisition unit 201, a text analysis unit 202, a knowledge reference unit 203, a response generation unit 204, an unknown keyword detection unit 205, a related keyword estimation unit 206, a response transmission unit 207, and a question-answering knowledge 208.

The input sentence acquisition unit 201 acquires an input sentence from the user. For example, the input sentence acquisition unit 201 receives a speech signal from the terminal device 102 (FIG. 1), performs speech recognition on the received speech signal, and acquires a text acquired thereby as an input sentence. In an embodiment where the terminal device 102 transmits text data to the interactive apparatus 101, the input sentence acquisition unit 201 acquires a text indicated by the text data received from the terminal device 102 as an input sentence. The input sentence acquisition unit 201 transmits the input sentence to the text analysis unit 202 and the unknown keyword detection unit 205.

The text analysis unit 202 receives the input sentence from the input sentence acquisition unit 201, and analyzes the received input sentence. For example, the text analysis unit 202 extracts, from the input sentence, information necessary for answering a question. The information necessary for answering a question is information based on which candidates for an answer can be acquired by referring to the question-answering knowledge 208. The information necessary for answering a question includes an important keyword in the input sentence or a feature vector of the important keyword, or a result of estimating the meaning of the input sentence or the meaning of the input sentence expressed by a vector. The text analysis unit 202 transmits information necessary for answering a question to the knowledge reference unit 203.

As an analysis method for extracting an important keyword or its feature vector, the following methods may be used, for example: a method in which a list of important keywords (hereinafter referred to as an "important keyword list") is prepared in advance, and an important keyword is extracted from an input sentence by simple matching using the important keyword list; a method in which closeness in meaning between an important keyword in the important keyword list and a keyword in the input sentence is measured based on distributed representation of words, etc. to extract a keyword with a close meaning; and a method in which an important keyword in the input sentence is specified by using a model learned with data labeled with the correct answer indicating which word in the sentence is an important keyword. As a method for acquiring a meaning of the input sentence or a vector of the meaning, the following methods may be used, for example: a method in which the meaning of the input sentence is estimated by using a model learned with data where a sentence is associated with its meaning; and a method using distributed representation of a sentence. Existing methods other than those listed above are also applicable.

The knowledge reference unit 203 receives information necessary for answering a question from the text analysis unit 202, refers to the question-answering knowledge 208 based on the received information, and acquires one or more candidates for an answer to the input sentence. The question-answering knowledge 208 stores a question, an answer, and information corresponding to the information acquired by the text analysis unit 202, in association with each other. In the present embodiment, the text analysis unit 202 extracts an important keyword from the input sentence, and the question-answering knowledge 208 stores a question, an answer, and an important keyword in association with each other. In an embodiment where the text analysis unit 202 estimates a meaning of an input sentence, the question-answering knowledge 208 stores a question, an answer, and a meaning of a question in association with each other. The knowledge reference unit 203 extracts, from the question-answering knowledge 208, one or more answers including information close to the information acquired by the text analysis unit 202 as one or more candidates for the answer. The knowledge reference unit 203 transmits the candidates for the answer to the response generation unit 204. The candidates for the answer may include, along with the answer, information acquired from the question-answering knowledge 208 such as the question and the important keyword associated with the answer.

The response generation unit 204 receives the candidates for the answer from the knowledge reference unit 203, and generates a response to the input sentence based on the received candidates for the answer. The response generation unit 204 transmits the response to the response transmission unit 207. The response transmission unit 207 receives the response from the response generation unit 204, and transmits a response signal including the response to the terminal device 102.

A response may be generated by various methods. Those methods include: a method in which an answer among the candidates for an answer that most suitably answers the user's question is presented; a method in which question sentences associated with respective candidates for an answer are presented to the user so that the user selects one; and a method in which a response to elicit additional information from the user by using important keywords, etc. associated with respective candidates for an answer is presented in order to narrow down the candidates for an answer. The method for presenting a response is not limited to outputting a response sentence: it is also possible to display question sentences or important keywords associated with the candidates for an answer so that the user can select one on a user interface.

The unknown keyword detection unit 205 receives the input sentence from the input sentence acquisition unit 201, and detects an unknown keyword from the input sentence. The unknown keyword is a keyword not registered in the dictionary (for example, the important keyword list and the question-answering knowledge 208) referred to by the interactive apparatus 101. Thus, a candidate for an answer cannot be acquired by referring to the question-answering knowledge 208 based on the unknown keyword. The unknown keyword detection unit 205 transmits the unknown keyword to the related keyword estimation unit 206.

An unknown keyword may be detected by a method using an expression around a word or a word string. Since new unknown keywords will increase, a method using a keyword list prepared in advance is not realistic. Furthermore, in a method using only part of speech information such as a method extracting all the words or word strings that are nouns, it is highly likely that unnecessary words or word strings are extracted. Therefore, a method in which a word or a word string accompanying a specific expression is extracted as an unknown keyword by using a grammatical rule prepared in advance, or a method in which an unknown keyword is extracted by learning a model with an important keyword in the learning data replaced with the same word or a randomly-selected word is used.

Figure 3:
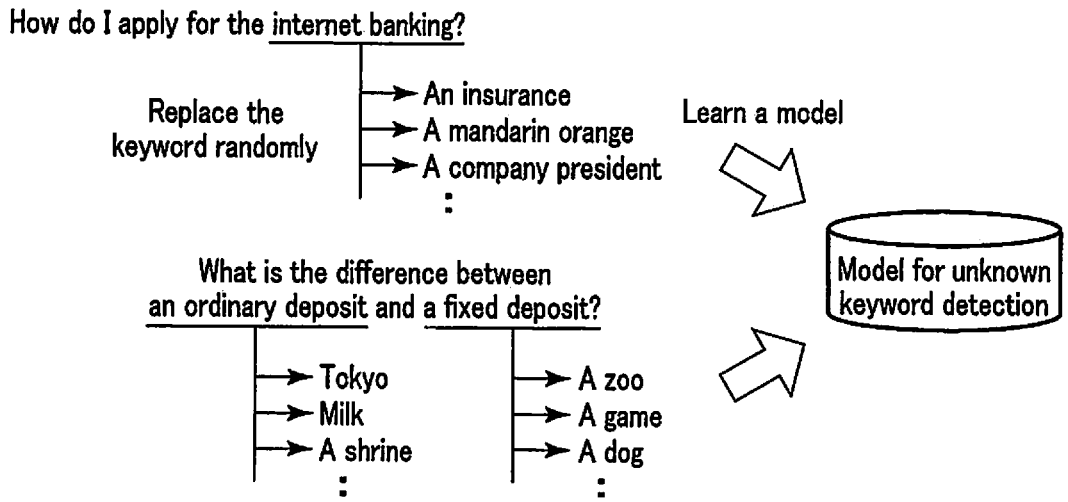
FIG. 3 is a diagram that explains a method for detecting an unknown keyword according to the embodiment.

A method in which a model for unknown keyword detection is learned with a sentence acquired by replacing a word or a word string corresponding to an important keyword with another word or word string will be described with reference to FIG. 3. The learning data is a group of sentences in which a correct-answer label is attached to an important keyword (a keyword that the interactive apparatus 101 originally knows as being important), and this learning data does not include an unknown keyword. If a model is learned with this learning data, it is possible to estimate whether or not a word or a word string included in a sentence is important, but an unknown keyword cannot be detected. In the present embodiment, as shown in FIG. 3, a sentence acquired by replacing an important keyword in a sentence with another word is generated, and a model is learned with learning data including such a sentence. This makes it difficult for a model to estimate, from information of a word itself labeled as important, why this word is an important keyword. On the other hand, the expression around the important keyword in the learning data is considered to have regularity to some extent. Accordingly, if there is a specific expression, the learned model estimates which word or word string is an important keyword. Since an expression is referred to, the word or word string can be extracted whether or not the word or word string is included in the learning data, which enables detection of an unknown keyword.

The example of FIG. 3 shows two sentences, "How do I apply for the Internet banking?" and "What is the difference between an ordinary deposit and a fixed deposit?" as sentences in which a correct-answer label is attached to an important keyword. In the former sentence, "Internet banking" is an important keyword, and sentences in which "Internet banking" is replaced with other words or word strings are generated; for example, "How do I apply for an insurance?," "How do I apply for a mandarin orange?," and "How do I apply for a company president?" In the latter sentence, "ordinary deposit" and "fixed deposit" are important keywords, and sentences in which these terms are replaced with other words or word strings are generated; for example, "What is the difference between Tokyo and a zoo?," "What is the difference between milk and a game?," and "What is the difference between a shrine and a dog?" The model is learned with these sentences. As a result, if estimation is made regarding a sentence including a phrase, "How do I apply for AAA?" by using a learned model, "AAA" is extracted as a keyword. AAA is a given word or word string. If estimation is made regarding a sentence including a phrase, "What is the difference between BBB and CCC?" by using a learned model, "BBB" and "CCC" are extracted as keywords. BBB and CCC are given words or word strings.

A keyword extracted by the above method may not be an unknown keyword, but be an important keyword. Thus, for example, it is determined whether or not the extracted keyword is included in the important keyword list. If the extracted keyword is not included in the important keyword list, the extracted keyword is determined to be an unknown keyword.

In the above method, both of unknown keywords and important keywords can be detected. Therefore, the configuration example in FIG. 2 shows the text analysis unit 202 and the unknown keyword detection unit 205 separately; however, the text analysis unit 202 and the unknown keyword detection unit 205 can be configured as one element.

In another embodiment, the text analysis unit 202 includes the function of the unknown keyword detection unit 205, and detects unknown keywords and important keywords by the above method. Specifically, the text analysis unit 202 extracts a keyword from an input sentence in accordance with the above method, and determines whether the extracted keyword is an important keyword or an unknown keyword by referring to the important keyword list. The information necessary for answering a question that includes an important keyword or its feature vector is transmitted to the knowledge reference unit 203. An unknown keyword is transmitted to the related keyword estimation unit 206.

The related keyword estimation unit 206 receives the unknown keyword from the unknown keyword detection unit 205, and acquires one or more candidates for a related keyword having a close meaning to the unknown keyword from predetermined keywords (keywords that the system knows). The related keyword estimation unit 206 transmits the candidates for a related keyword to the response generation unit 204. A method for acquiring the candidates for a related keyword will be described later.

The response generation unit 204 receives the candidates for a related keyword from the related keyword estimation unit 206, and generates a response to the input sentence based on the candidates for a related keyword. The response generation unit 204 may generate a response to the input sentence based on the candidates for an answer received from the knowledge reference unit 203 in addition to the candidates for a related keyword.

In the present embodiment, the interactive apparatus 101 is configured as one device. The interactive apparatus 101 may be implemented by a plurality of devices. For example, the question-answering knowledge 208 may be provided in a device (not shown) different from the interactive apparatus 101.

Next, an operation example of the interactive apparatus 101 will be described.

Figure 4:
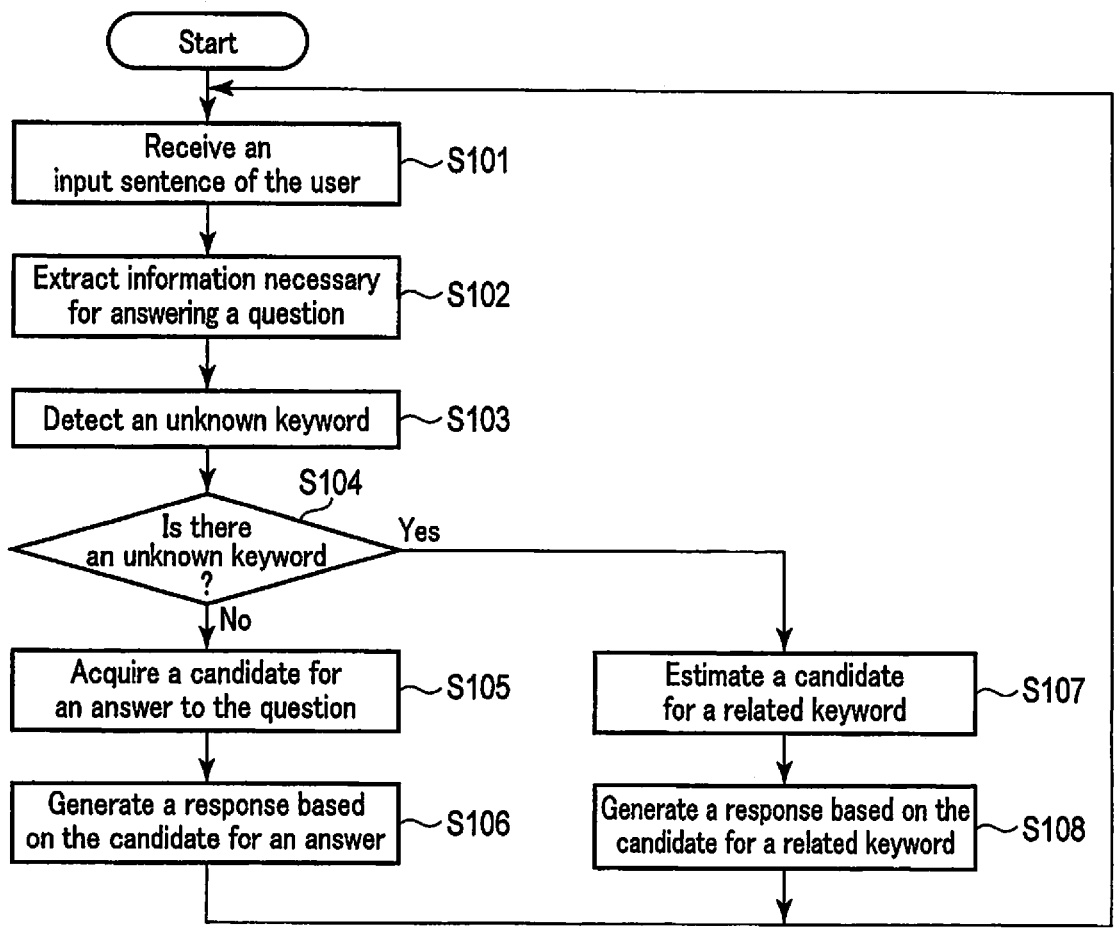
FIG. 4 is a flowchart showing an example of operations of the interactive apparatus shown in FIG. 2.

FIG. 4 schematically shows an example of the processing procedure in which the interactive apparatus 101 generates a response to the input sentence. As shown in FIG. 4, first, the input sentence acquisition unit 201 acquires an input sentence of the user (step S101).

The text analysis unit 202 extracts information necessary for answering a question from the acquired input sentence (step S102). The unknown keyword detection unit 205 detects an unknown keyword from the acquired input sentence (step S103). In the example shown in FIG. 4, the processing of step 103 is performed after the processing of step 102. The processing of step S103 may be performed parallel to the processing of step S102, or may be performed before the processing of step S102.

It is determined whether or not an unknown keyword is detected (step S104). If an unknown keyword is not detected (step S104; No), the processing proceeds to step S105. The knowledge reference unit 203 acquires one or more candidates for an answer to the input sentence (the question of the user) based on the information necessary for responding to the question acquired in step S102 and the question-answering knowledge 208 (step S105). The response generation unit 204 generates a response to the input sentence based on the candidates for an answer acquired by the knowledge reference unit 203 (step S106). After the response transmission unit 207 transmits the response to the terminal device 102, the processing returns to step S101.

If an unknown keyword is detected (step S104; Yes), the processing proceeds to step S107. The related keyword estimation unit 206 acquires one or more candidates for a related keyword having a close meaning to the detected keyword from predetermined keywords (step S107). The response generation unit 204 generates a response based on the candidates for a related keyword estimated by the related keyword estimation unit 206 (step S108). After the response transmission unit 207 transmits the response to the terminal device 102, the processing returns to step S101.

As a method for estimating the candidates for a related keyword in step S107, methods described below can be used. A first method is to use an edit distance between a predetermined keyword and the unknown keyword. An edit distance is an indicator that indicates how many characters are needed to be replaced, inserted, or deleted to make two character strings identical to each other. For example, an edit distance between "自動車用のローン (loan dedicated to automobiles)" "自動車ローン (automobile loan)" is taken as an example. Since "自動車ローン (automobile loan)" is acquired by deleting the two characters, "用 (dedicated)" and "の(to)" from "自動車用のローン (loan dedicated to automobiles)," the edit distance is 2. If the edit distance between the unknown keyword and a keyword is small, the unknown keyword may be the user's speech error or input error, or a speech recognition error; thus, it is highly likely that this keyword is a candidate for a related keyword regarding the unknown keyword. A keyword having an edit distance equal to or less than a threshold is estimated as a candidate for a related keyword.

A second method is to use matching with a partial word of a keyword. Specifically, in the second method, each keyword and the unknown keyword are divided into words, and it is determined whether or not a keyword is close to the unknown keyword based on a matching degree between partial words acquired by dividing the keyword and partial words acquired by dividing the unknown keyword. For example, if an unknown keyword is "special deposit" and a keyword is "especial ordinary deposit," they are divided as "special/deposit" and "especial/ordinary/deposit," and "deposit" is a matching word. In this case, the matching degree is 1. Words having close meanings in the distributed representation of words may be considered as matching. In such a case, "special" and "especial" are considered to match, and the matching degree is 2. As the matching degree between words acquired from the distributed representation of words, closeness in meaning such as a distance of a word vector in the distributed representation may be used. For example, a keyword with a matching degree equal to or larger than the threshold value is estimated as a candidate for a related keyword.

A third method is to make an estimate based on an expression around a word or a word string. For example, in the third method, if "special deposit" is detected as an unknown keyword in the input sentence of "How much is the interest on a special deposit?," it is determined that "special deposit" is a keyword indicating a financial product based on the expression, "interest on," and keywords in the category of financial product are estimated as candidates for a related keyword. The third method can be implemented by estimating a category (e.g., financial products) of the unknown keyword based on an expression around the unknown keyword by using grammatical rules or a learned model, and checking the category against a category added to each keyword. Instead of estimating a category based on grammatical rules or a learned model, a candidate for a related keyword may be estimated directly.

A fourth method is to use a result of referring to the question-answering knowledge 208 based on an important keyword. For example, in an input sentence, "What is the fee for the anywhere-remittance service?," it is assumed that "anywhere-remittance service" is extracted as an unknown keyword and "fee" is extracted as an important keyword. Herein, assume that the question-answering knowledge 208 is referred to based on "fee," and it matches question sentences, "What is the fee for money transfer?" and "What is the fee for overseas remittance?" The question sentence, "What is the fee for money transfer?" is associated with two important keywords, "money transfer" and "fee." The question sentence, "What is the fee for overseas remittance?" is associated with two important keywords, "overseas remittance" and "fee." In this case, two important keywords, "money transfer" and "overseas remittance" are estimated as candidates for a related keyword regarding the "anywhere-remittance service." In the case of using the fourth method, even if an unknown keyword is detected, the knowledge reference unit 203 performs the processing of step S105, and transmits the candidates for an answer to the related keyword estimation unit 206.

As a method for estimating the candidates for a related keyword, any one of the above four methods or combinations thereof may be used. In this case, the candidate may be estimated not only by combining candidates estimated in the four methods, but also by integrally considering the edit distance and the matching degree used for the estimation.

The response generation unit 204 switches a method for generating a response in accordance with information acquired from the candidates for a related keyword. A number of the candidates for a related keyword and closeness in meaning between each of the candidates for a related keyword and the unknown keyword can be used as information acquired from the candidate for a related keyword. If the closeness in meaning between the candidates for a related keyword and the unknown keyword is used, the related keyword estimation unit 206 calculates closeness in meaning between each of the candidates and the unknown keyword between step S107 and step S108, and transmits the calculated closeness in meaning to the response generation unit 204 along with the candidates for a related keyword. As an indicator indicating the closeness in meaning, the criteria used when acquiring the candidates for a related keyword regarding the unknown keyword can be directly used.

Figure 6:
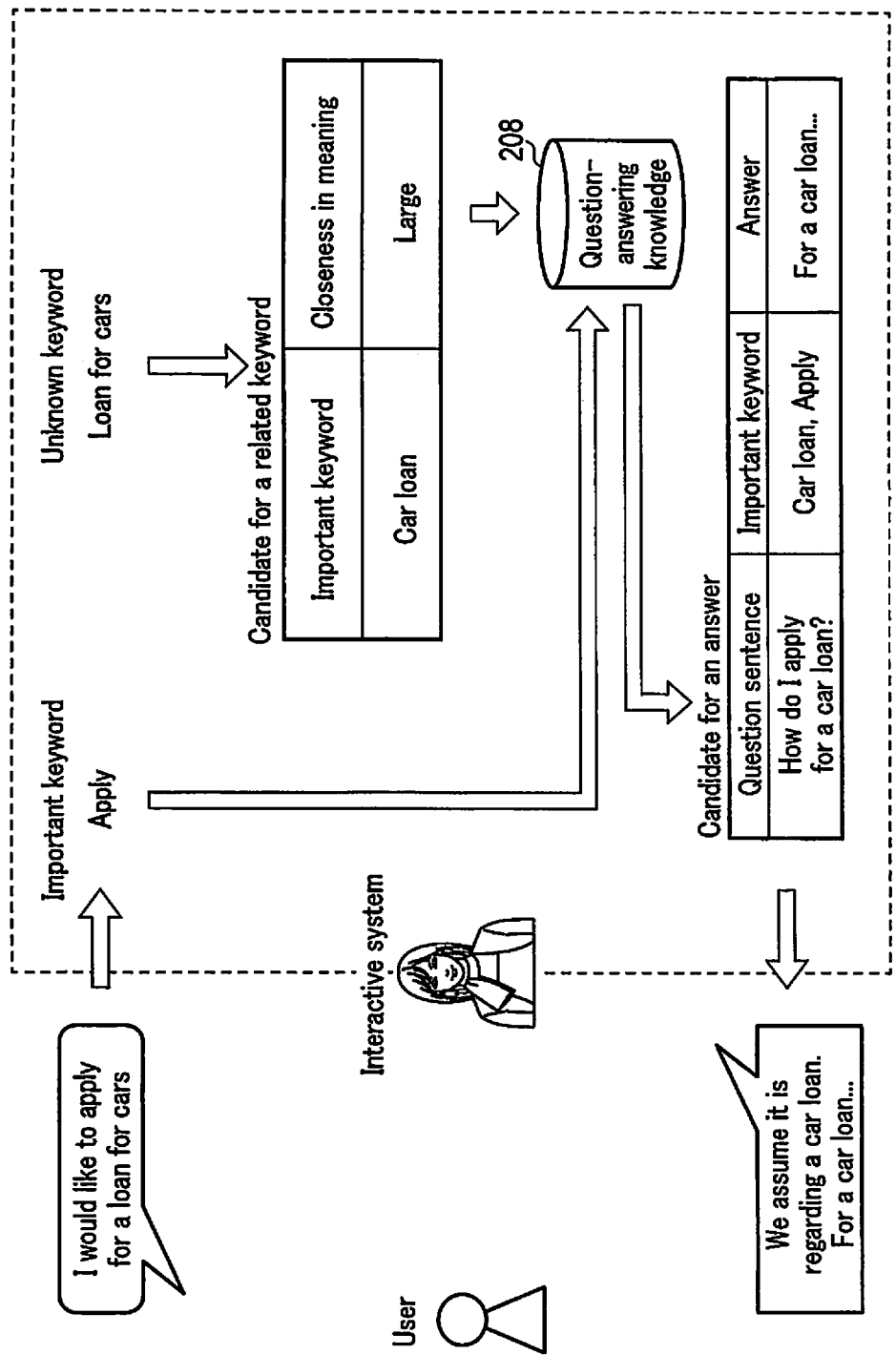
FIG. 6 is a diagram showing an example of a conversation between the interactive apparatus shown in FIG. 2 and a user.
Figure 7:
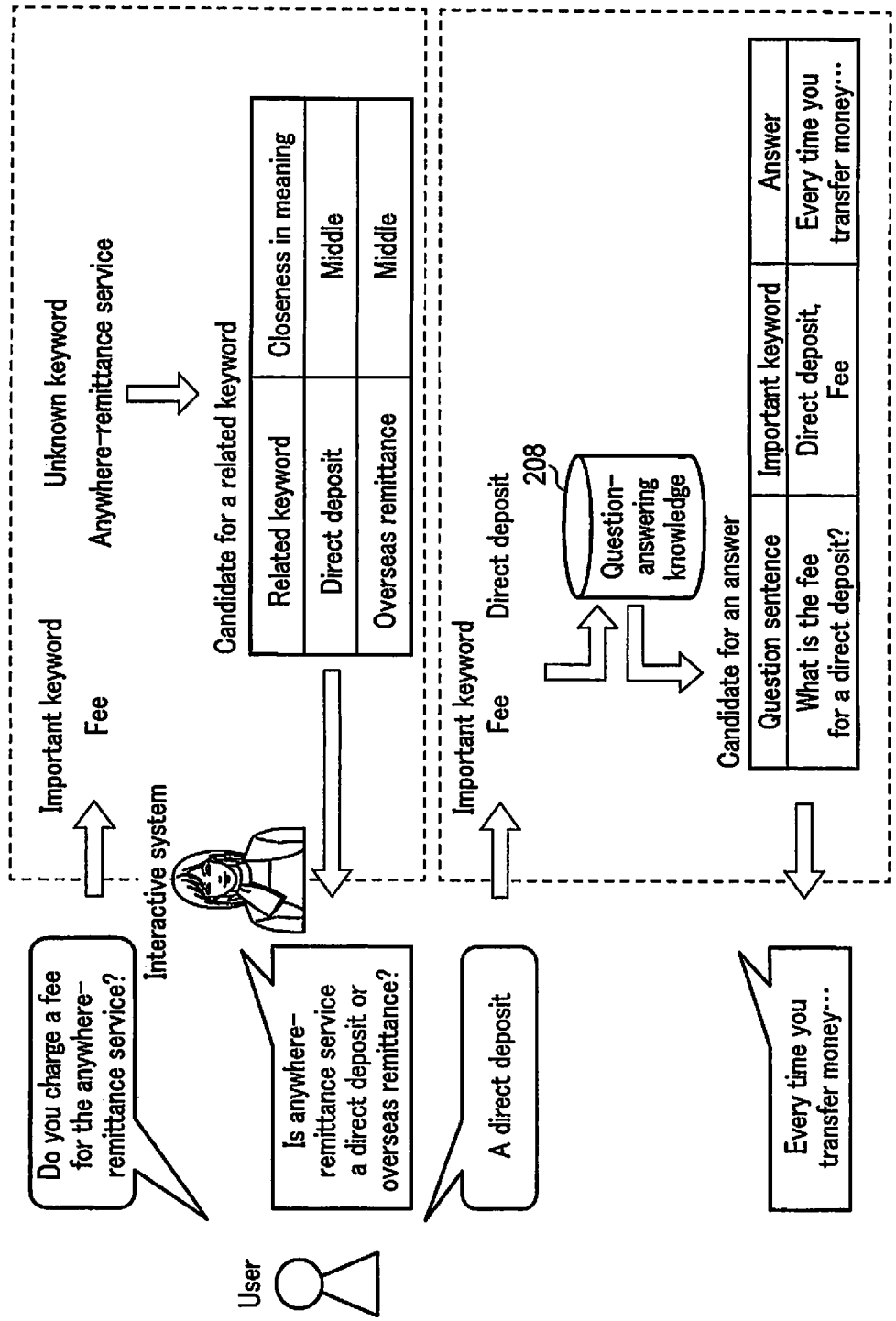
FIG. 7 is a diagram showing an example of a conversation between the interactive apparatus shown in FIG. 2 and a user.

Next, an example conversation between a user and the interactive apparatus 101 will be described with reference to FIGS. 5 to 7. FIGS. 6 and 7 show response examples of the interactive apparatus 101 in a case where the input sentence from the user includes an unknown keyword, and show that a conversation can be carried on smoothly even if the input sentence includes an unknown keyword.

Herein, the interactive system 100 is assumed to be an interactive system that is used in banks and answers frequently-asked questions. The interactive system 100 extracts an important keyword from an input sentence by keyword matching with words registered in a dictionary (important keyword list) prepared in advance. The question-answering knowledge 208 stores a question sentence, an answer, and an important keyword extracted from the question sentence in association with each other. The interactive system acquires a candidate for an answer by associating the input sentence and the question sentence at keyword level. However, as described above, other methods may be used for acquiring information necessary for responding to the question and a candidate for an answer.

Figure 5:
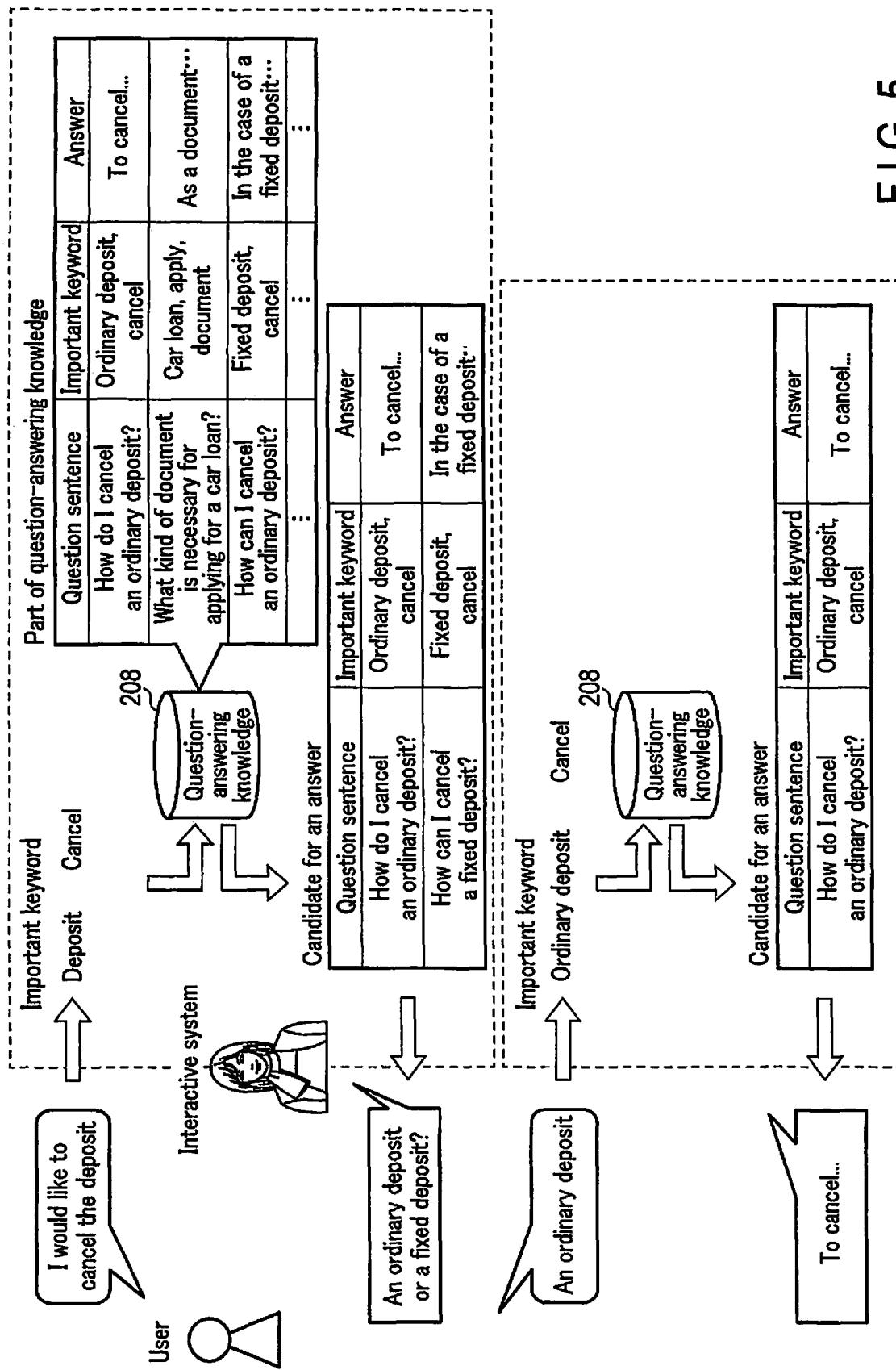
FIG. 5 is a diagram showing an example of a conversation between the interactive apparatus shown in FIG. 2 and a user.

FIG. 5 shows a conversation example of a case where a conversation is held without an unknown keyword being detected. In the example shown in FIG. 5, the user inputs "I would like to cancel the deposit." "Deposit" and "cancel" are extracted as important keywords by keyword matching with the words registered in the dictionary. These important keywords are checked against the question-answering knowledge 208. As a result, data including question sentences, "How do I cancel an ordinary deposit?" and "How can I cancel a fixed deposit?" is acquired as candidates for an answer. The interactive apparatus 101 refers to important keywords in each candidate for an answer, and recognizes that "ordinary deposit" and "fixed deposit" are different important keywords among the candidates for an answer. In this case, the interactive apparatus 101 generates a response for confirming which of "ordinary deposit" and "fixed deposit" the user intends. For example, the interactive apparatus 101 outputs a response sentence, "An ordinary deposit or a fixed deposit?" If the user inputs "An ordinary deposit" in response to the response sentence, the interactive apparatus 101 adds "ordinary deposit" to previously acquired important keywords and refers to the question-answering knowledge 208 based on those important keywords. As a result, data including a question sentence, "How do I cancel an ordinary deposit?" is acquired as a candidate for an answer. Since one candidate for an answer is acquired, the interactive apparatus 101 outputs an answer, "To cancel . . . " included in this candidate for an answer.

In this manner, the interactive apparatus 101 makes an inquiry to the user if information given by the user is insufficient or ambiguous, thereby correctly answering the user's question. If the user and the interactive apparatus 101 interact a few times, the text analysis unit 202 or the knowledge reference unit 203 needs to accumulate the information given by the user.

FIG. 6 shows a conversation example of a case where the input sentence includes an unknown keyword. In the example shown in FIG. 6, the user inputs "I would like to apply for a loan for cars" to the terminal device 102. The interactive apparatus 101 extracts "apply" as an important keyword by keyword matching, and extracts "loan for cars" as an unknown keyword based on context information. The interactive apparatus 101 acquires a candidate for a related keyword having a meaning close to "loan for cars." Furthermore, the interactive apparatus 101 calculates the closeness in meaning between the unknown keyword and the candidate for a related keyword. In this example, "car loan" is extracted as a candidate for a related keyword, and the closeness in meaning is calculated as "large" (very close). Since only one candidate for a related keyword having a very close meaning to the unknown keyword, "loan for cars" is acquired, the interactive apparatus 101 considers the candidate for a related keyword, "car loan" as a related keyword related to "loan for cars." Then, the interactive apparatus 101 refers to the question-answering knowledge 208 based on "car loan" and "apply," and outputs an answer, "For a car loan . . . " acquired thereby as a response. At this time, the interactive apparatus 101 adds a sentence such as "We assume it is regarding a car loan." at the beginning of the response in order to inform the user that "loan for cars" input by the user is replaced with "car loan." In this manner, if there is one candidate for a related keyword having a meaning close to the unknown keyword, the interactive apparatus 101 determines the candidate for a related keyword as a related keyword, and generates a response by using the related keyword.

In order to implement the above operation, the related keyword estimation unit 206 transmits "car loan" determined as a related keyword to the knowledge reference unit 203, and the knowledge reference unit 203 refers to the question-answering knowledge 208 based on "car loan" received from the related keyword estimation unit 206 and "apply" received from the text analysis unit 202. The unknown keyword detection unit 205 transmits the detected unknown keyword to the response generation unit 204 in order to include, in the response, information indicating that "loan for cars" as the unknown keyword is replaced with "car loan."

FIG. 7 shows a conversation example of a case where the input sentence includes an unknown keyword. In the example shown in FIG. 7, the user inputs "Do you charge a fee for the anywhere-remittance service?" The interactive apparatus 101 extracts "fee" as an important keyword, and extracts "anywhere-remittance service" as an unknown keyword. As candidates for a related keyword regarding "anywhere-remittance service," "direct deposit" and "overseas remittance" are acquired, both of which having "middle" closeness (close) in meaning. The interactive apparatus 101 asks the user the meaning of the unknown keyword while presenting the candidates for a related keyword; for example, "Is anywhere-remittance service a direct deposit or overseas remittance?" If the user inputs "A direct deposit" in response to this inquiry, the interactive apparatus 101 determines "direct deposit" as a related keyword, refers to the question-answering knowledge 208 based on "direct deposit" and "fee," and responds to the user by using a candidate for an answer acquired thereby. Specifically, the interactive apparatus 101 outputs an answer, "Every time you transfer money . . . " In this manner, a conversation can be carried on smoothly by asking a meaning of an unknown keyword based on words that the system knows.

Two candidates for a related keyword are acquired in the example shown in FIG. 7; however, three or more candidates for a related keyword may be acquired. In such a case, it may be difficult to include all of the candidates for a related keyword in the response. For example, the interactive apparatus 101 may select a predetermined number of candidates in an order from a candidate having the closest meaning, and generate a response by using the selected candidates. Alternatively, the interactive apparatus 101 may select candidates in the same category (attribute) and generate a response by using the selected candidates. If there are many candidates in the same category, the interactive apparatus 101 may select, from these candidates, a predetermined number of candidates in an order from a candidate with the closest meaning. A category is previously added to each keyword registered in the dictionary (keyword list) referred to by the related keyword estimation unit 206.

After asking the user the meaning of the unknown keyword by using the candidates for a related keyword, the user may input a reply that the unknown keyword corresponds to none of the presented candidates for a related keyword; for example, "No" or "None of them." In such a case, the remaining candidates for a related keyword are presented. The interactive apparatus 101 may select, from the remaining candidates for a related keyword, candidates in an order from a candidate with the closest meaning. The interactive apparatus 101 may select a candidate with a category different from the category of the candidates for a related keyword presented immediately before. This is because the user is highly likely to input some kind of keyword if a keyword in a category close to the information input by the user is presented; on the other hand, if the user inputs "No," the user is highly likely to require information in a different category. Presenting a candidate in another category increases the possibility that the user inputs the user's desired condition with keywords that the system knows, and the system is considered to become easier for the user to use.

In the conversation example shown in FIG. 7, the candidates for a related keyword may be displayed on the screen of the display device of the terminal device 102 so that the user can select one of the candidates as shown in FIG. 8. In this case, even if there are many candidates for a related keyword, all of them can be presented to the user.

FIGS. 6 and 7 show examples where a response is switched in accordance with the number of the candidates for a related keyword or closeness in meaning to the unknown keyword; however, there may be other kinds of response.

Figure 9:
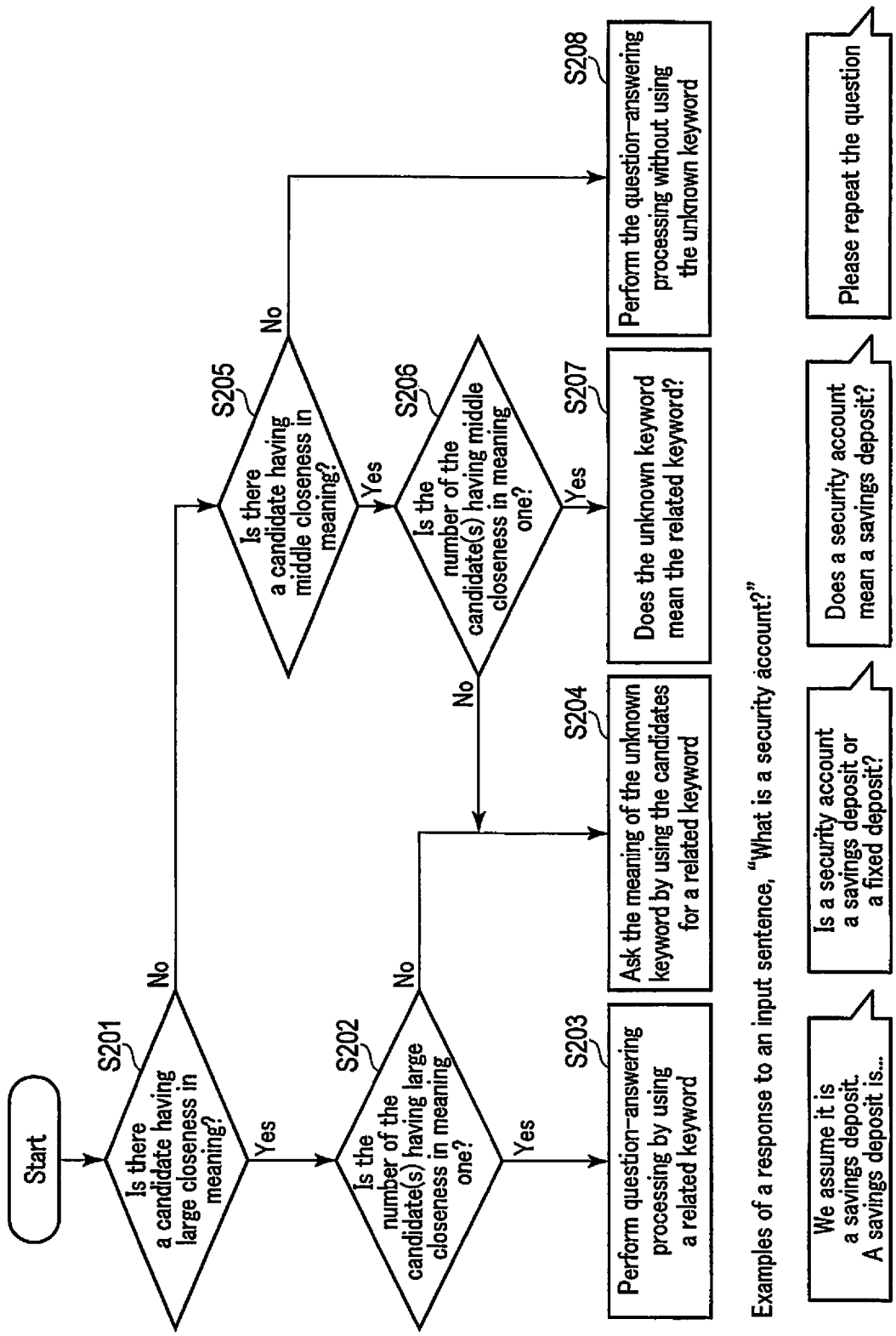
FIG. 9 is a flowchart showing processing to switch a response generation method in accordance with information acquired from one or more candidates for a related keyword according to the embodiment.

FIG. 9 schematically shows processing of switching a response generation method in accordance with information acquired from the candidates for a related keyword.

It is determined whether or not there is a candidate having large closeness in meaning (step S201). If there is a candidate having large closeness in meaning (step S201; Yes), the processing proceeds to step S202. It is determined whether or not the number of the candidate(s) having large closeness in meaning is one (step S202). If the number of the candidate(s) having large closeness in meaning is one (step S202; Yes), the processing proceeds to step S203. The interactive apparatus 101 determines the candidate having large closeness in meaning as a related keyword, and performs question-answering processing by using the related keyword. This question-answering processing corresponds to the processing described with reference to FIG. 6. For example, if "savings deposit" is acquired as a related keyword regarding an unknown keyword, "security account," the interactive apparatus 101 presents a response sentence, "We assume it means a savings deposit. A savings deposit is . . . " to the user.

If there are two or more candidates having large closeness in meaning (step S202; No), the processing proceeds to step S204. The interactive apparatus 101 asks the user the meaning of the unknown keyword by using the candidates having large closeness in meaning (step S204). This inquiry corresponds to the processing described with reference to FIG. 7. For example, if "savings deposit" and "fixed deposit" are acquired as related keywords regarding the unknown keyword, "security account," the interactive apparatus 101 presents a response sentence, "Is a security account a savings deposit or a fixed deposit?" to the user.

If there is no candidate having large closeness in meaning (step S201; No), the processing proceeds to step S205. It is determined whether or not there is a candidate having middle closeness in meaning (step S205). If there is a candidate having middle closeness in meaning (step S205; Yes), the processing proceeds to step S206. It is determined whether or not the number of the candidate(s) having middle closeness in meaning is one (step S206). If the number of the candidate(s) having middle closeness in meaning is one (step S206; Yes), the processing proceeds to step S207. The interactive apparatus 101 determines the candidate having middle closeness in meaning as a related keyword, and asks the user whether or not the unknown keyword means the related keyword (step S207). For example, if "savings deposit" is acquired as a related keyword regarding the unknown keyword, "security account," the interactive apparatus. 101 presents a response sentence, "Does a security account mean a savings deposit?" to the user.

If there are two or more candidates having middle closeness in meaning (step S206; No), the processing proceeds to step S204. The interactive apparatus 101 asks the user the meaning of the unknown keyword by using the candidates having middle closeness in meaning (step S204). This inquiry corresponds to the processing described with reference to FIG. 7. For example, if "savings deposit" and "fixed deposit" are acquired as related keywords regarding an unknown keyword, "security account," the interactive apparatus 101 presents a response sentence, "Is a security account a savings deposit or a fixed deposit?" to the user.

If there is no candidate having middle closeness in meaning (step S205; No), the processing proceeds to step S208. The interactive apparatus 101 performs the question-answering processing without using the unknown keyword (step S208). For example, the interactive apparatus 101 presents a response sentence, "Please repeat the question." to the user.

The flow chart shown in FIG. 9 is an example, and there may be other variations of classification. The closeness in meaning is expressed by discrete values as large, middle and small; however, the closeness in meaning may be expressed in continuous values, and the determination may be made based on comparison with a threshold when switching the response generation method. For example, in step S201, it may be determined whether there is a candidate having closeness in meaning over the threshold. The flow chart for switching the response generation method may not only be manually generated by a human, but may also be automatically generated from data by reinforcement learning.

Figure 10:
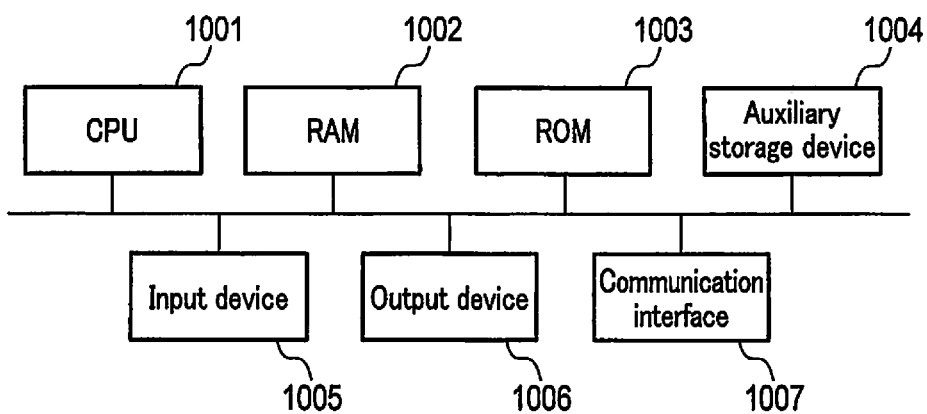
FIG. 10 is a block diagram showing an example of a hardware configuration of the interactive apparatus according to the embodiment.

FIG. 10 schematically shows an example of a hardware configuration of the interactive apparatus 101. As shown in FIG. 10, the interactive apparatus 101 includes a central processing unit (CPU) 1001, a random access memory (RAM) 1002, a read only memory (ROM) 1003, an auxiliary storage device 1004, an input device 1005, an output device 1006, and a communication interface 1007.

The above-described function of the interactive apparatus 101 is implemented by loading, on the RAM 1002, a program stored in the ROM 1003 or the auxiliary storage device 1004 by the CPU 1001, and executing this program by the CPU 1001. The CPU 1001 is an example of a hardware processor. A hardware processor is not limited to a general-purpose processor such as the CPU 1001, but may be a dedicated processor such as an application specific integrated circuit (ASIC) or a field-programmable gate array (FPGA).

The auxiliary storage device 1004 includes a computer-readable storage medium that stores data in a non-volatile manner, and may be a hard disk drive (HDD) or a solid state drive (SSD), for example. The input device 1005 includes a keyboard and a mouse, for example. The output device 1006 includes a display device and a speaker.

The communication interface 1007 is an interface for communicating with an exterior device (for example, the terminal device 102). The communication interface 1007 includes a local area network (LAN) port, for example, is connected to the communication network NW by using a LAN cable, for example, and transmits/receives data to/from the exterior device via the communication network NW. The communication interface 1007 may include a wireless module such as a wireless LAN module or a Bluetooth (registered trademark) module.

As described above, according to the interactive apparatus of the present embodiment, it is possible to generate a response that can smoothly carry on a conversation even with an input sentence including an unknown keyword, by detecting an unknown keyword from an input sentence of a user, acquiring one or more candidates for a related keyword having a meaning close to the unknown keyword, and generating a response based on information acquired from the candidates for a related keyword.

The instructions included in the steps described in the above embodiment can be implemented based on a software program. It is possible to configure a general-purpose computer system to store this program in advance and to read the program in order to perform the same advantage as that performed by the above-described interactive apparatus. The instructions described in the above embodiment are stored in a magnetic disc (flexible disc, hard disc, etc.), an optical disc (CD-ROM, CD-R, CD-RW, DVD-ROM, DV±R, DVD±RW, Blu-ray (registered trademark) disc, etc.), a semiconductor memory, or a similar storage medium, as a program executable by a computer. As long as the storage medium is readable by a computer or by an embedded system, any storage format can be used. An operation similar to the operation of the interactive apparatus of the above-described embodiment can be realized if a computer reads a program from the storage medium, and executes the instructions written in the program on the CPU based on the program. The computer may, of course, acquire or read the program through a network.

Furthermore, an operating system (OS) working on a computer, database management software, middleware (MW) of a network, etc. may execute a part of processing for realizing the present embodiment based on instructions from a program installed from a storage medium onto a computer or an embedded system.

Moreover, the storage medium according to the present embodiment is not limited to a medium independent of a computer or an embedded system, but may include a storage medium storing or temporarily storing a program downloaded through a LAN or the Internet, etc.

In addition, the storage medium is not limited to one. The storage medium according to the present embodiment covers the case where the processing according to the present embodiment is carried out by multiple storage media, and can take any configuration.

The computer or embedded system in the present embodiment is used to execute each process in the present embodiment based on a program stored in a storage medium, and may be an apparatus consisting of a personal computer or a microcomputer, etc. or a system, etc. in which a plurality of apparatuses are connected through a network.

The computer adopted in the present embodiments is not limited to a personal computer; it may be a calculation processing apparatus, a microcomputer, etc. included in an information processor, and a device and apparatus that can realize the functions of the present invention by a program.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interactive system comprising:
   processing circuitry configured to:
   analyze an input sentence from a user;
   refer to a question-answering knowledge based on a result of analyzing the input sentence to acquire a candidate for an answer to the input sentence;
   detect, from the input sentence, an unknown keyword that is a keyword based on which the candidate for the answer cannot be acquired even by referring to the question-answering knowledge;
   acquire, in response to the detection of the unknown keyword, one or more candidates for a related keyword having a meaning close to the unknown keyword from predetermined keywords; and
   generate a response to the input sentence based on the candidate for the answer when the unknown keyword is not detected, and generate a response to the input sentence based on the one or more candidates for the related keyword when the unknown keyword is detected.

2. The interactive system according to claim 1, further comprising processing circuitry configured to determine whether or not to detect a word or a word string as the unknown keyword based on an expression around the word or the word string.

3. The interactive system according to claim 2, further comprising processing circuitry configured to detect the unknown keyword from the input sentence by using a model learned based on learning data, the learning data including:
   a first sentence including a first word or word string to which a label indicating that the first word or word string is correct; and
   a second sentence generated by replacing the first word or word string with a second word or word string.

4. The interactive system according to claim 1, further comprising processing circuitry configured to select the one or more candidates for the related keyword from the predetermined keywords based on at least one of:
   an edit distance between the unknown keyword and each of the predetermined keywords;
   a matching degree between partial words acquired by dividing the unknown keyword and partial words acquired by dividing each of the predetermined keywords;
   an expression around the unknown keyword; or
   information included in the candidate for the answer.

5. The interactive system according to claim 1, further comprising processing circuitry configured to measure closeness in meaning between the unknown keyword and the one or more candidates for the related keyword.

6. The interactive system according to claim 5, further comprising processing circuitry configured to measure the closeness in meaning between the unknown keyword and the one or more candidates for the related keyword based on at least one of:
   an edit distance between the unknown keyword and each of the one or more candidates for the related keyword;
   a matching degree between partial words acquired by dividing the unknown keyword and partial words acquired by dividing each of the one or more candidates for the related keyword;
   an expression around the unknown keyword; or
   information included in the candidate for the answer.

7. The interactive system according to claim 1, further comprising processing circuitry configured to generate the response to the input sentence based on at least one of:

a number of the one or more candidates for the related keyword; or closeness in meaning between the unknown keyword and each of the one or more candidates for the related keyword.

8. The interactive system according to claim 1, further comprising processing circuitry configured to:

select a candidate for the related keyword from the one or more candidates for the related keyword based on at least one of:

closeness in meaning between the unknown keyword and each of the one or more candidates for the related keyword; or whether or not the unknown keyword has an identical attribute to an attribute added to the one or more candidates for the related keyword; and generate a response to ask a meaning of the unknown keyword by using the selected candidate for the related keyword.

9. The interactive system according to claim 8, further comprising processing circuitry configured to:

generate a response to ask the meaning of the unknown keyword by using one or more candidates for the related keyword to which a first attribute is added; and when the user inputs, in response to the response to ask the meaning of the unknown keyword, a reply that the unknown keyword corresponds to none of the candidates for the related keyword to which the first attribute is added, generate a response to ask the meaning of the unknown keyword by using a candidate for the related keyword to which a second attribute different from the first attribute is added.

10. An interactive apparatus comprising:

processing circuitry configured to:

analyze an input sentence from a user;

refer to a question-answering knowledge based on a result of analyzing the input sentence to acquire a candidate for an answer to the input sentence;

detect, from the input sentence, an unknown keyword that is a keyword based on which the candidate for the answer cannot be acquired even by referring to the question-answering knowledge;

acquire, in response to the detection of the unknown keyword, one or more candidates for a related keyword having a meaning close to the unknown keyword from predetermined keywords; and generate a response to the input sentence based on the candidate for the answer when the unknown keyword is not detected, and generate a response to the input sentence based on the one or more candidates for the related keyword when the unknown keyword is detected.

11. An interactive method being performed by processing circuitry coupled to a memory, the method comprising:

analyzing an input sentence from a user;

referring to a question-answering knowledge stored in the memory based on a result of analyzing the input sentence to acquire a candidate for an answer to the input sentence;

detecting, from the input sentence, an unknown keyword that is a keyword based on which the candidate for the answer cannot be acquired even by referring to the question-answering knowledge;

acquiring, in response to the detection of the unknown keyword, one or more candidates for a related keyword having a meaning close to the unknown keyword from predetermined keywords; and generating a response to the input sentence based on the candidate for the answer when the unknown keyword is not detected, and generating a response to the input sentence based on the one or more candidates for the related keyword when the unknown keyword is detected.

12. A non-transitory computer readable medium including computer executable instructions, wherein the instructions, when executed by a processor, cause the processor to perform a method being performed by processing circuitry coupled to a memory, comprising:

analyzing an input sentence from a user;

referring to a question-answering knowledge stored in the memory based on a result of analyzing the input sentence to acquire a candidate for an answer to the input sentence;

detecting, from the input sentence, an unknown keyword that is a keyword based on which the candidate for the answer cannot be acquired even by referring to the question-answering knowledge;

acquiring, in response to the detection of the unknown keyword, one or more candidates for a related keyword having a meaning close to the unknown keyword from predetermined keywords; and generating a response to the input sentence based on the candidate for the answer when the unknown keyword is not detected, and generating a response to the input sentence based on the one or more candidates for the related keyword when the unknown keyword is detected.

* * * * *